Jan. 29, 1929.　　　　　　　　　　　　　　　　　1,700,435
J. W. DUVAL
AUTOMATIC ADVERTISING MACHINE
Filed Dec. 5, 1924　　　13 Sheets-Sheet 1
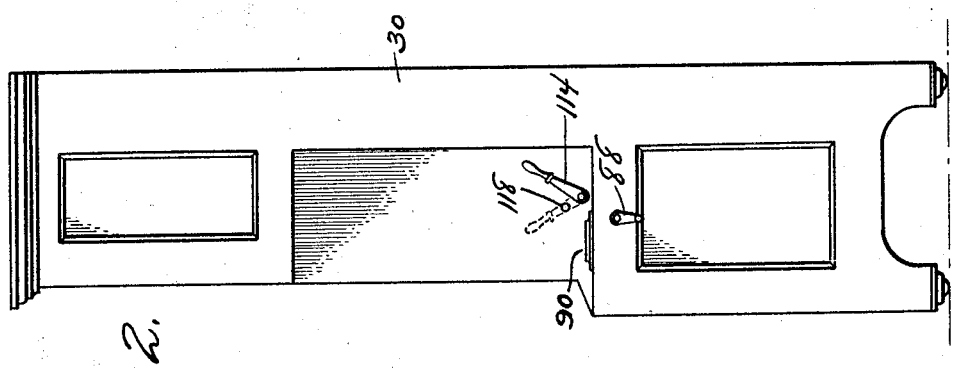
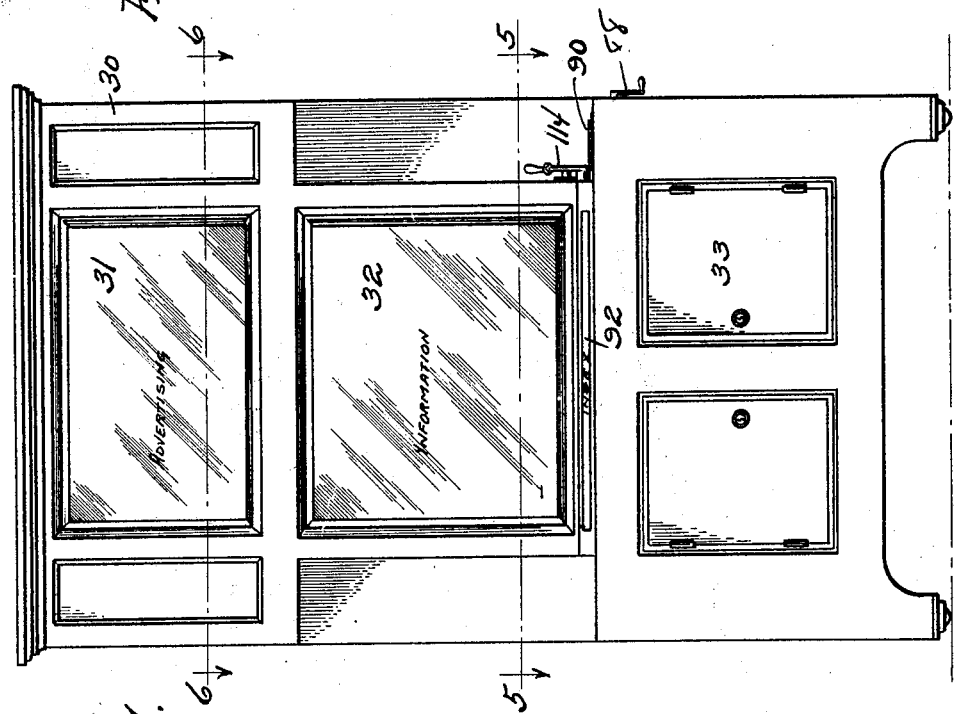

Jan. 29, 1929. 1,700,435
J. W. DUVAL
AUTOMATIC ADVERTISING MACHINE
Filed Dec. 5, 1924 13 Sheets-Sheet 2

J. W. Duval
INVENTOR
BY Victor J. Evans
ATTORNEY

Jan. 29, 1929.

J. W. DUVAL 1,700,435

AUTOMATIC ADVERTISING MACHINE

Filed Dec. 5, 1924    13 Sheets-Sheet 4

J. W. Duval
INVENTOR

BY Victor J. Evans
ATTORNEY

WITNESS:

Jan. 29, 1929.

J. W. DUVAL 1,700,435

AUTOMATIC ADVERTISING MACHINE

Filed Dec. 5, 1924     13 Sheets-Sheet 7

Jan. 29, 1929.　　　　　　　　　　　　　　　1,700,435
J. W. DUVAL
AUTOMATIC ADVERTISING MACHINE
Filed Dec. 5, 1924　　　13 Sheets-Sheet 8

J. W. Duval
INVENTOR
BY Victor J. Evans
ATTORNEY

WITNESS

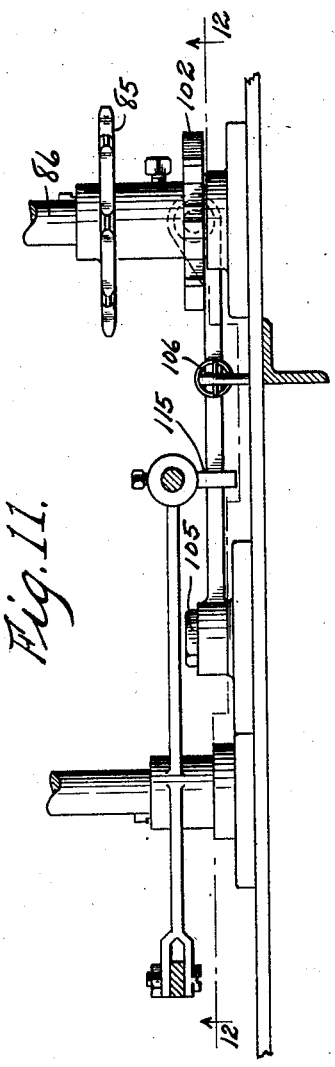
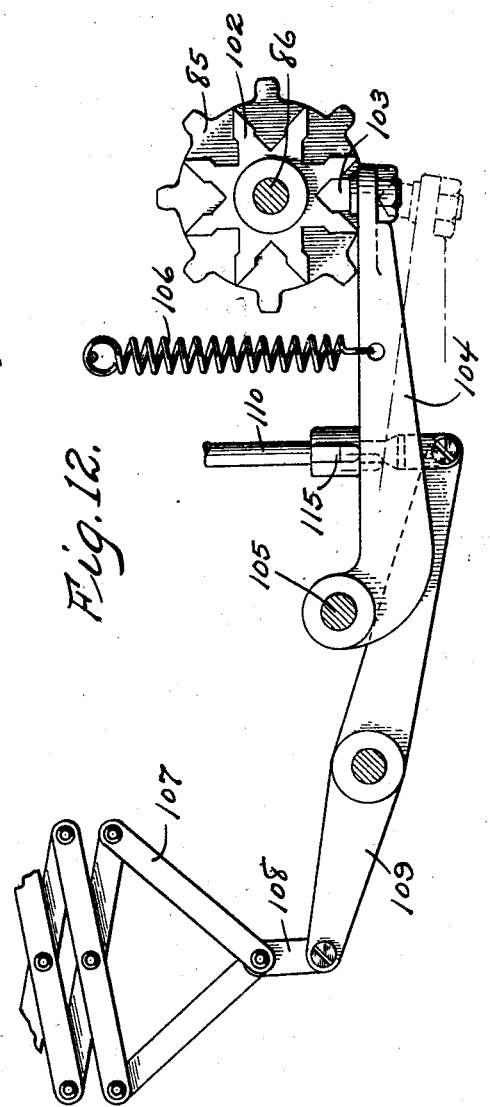

Jan. 29, 1929. 1,700,435
J. W. DUVAL
AUTOMATIC ADVERTISING MACHINE
Filed Dec. 5, 1924 13 Sheets-Sheet 10

J. W. Duval INVENTOR
BY Victor J. Evans
ATTORNEY

WITNESS:

Jan. 29, 1929.  
J. W. DUVAL  
1,700,435
AUTOMATIC ADVERTISING MACHINE
Filed Dec. 5, 1924   13 Sheets-Sheet 11
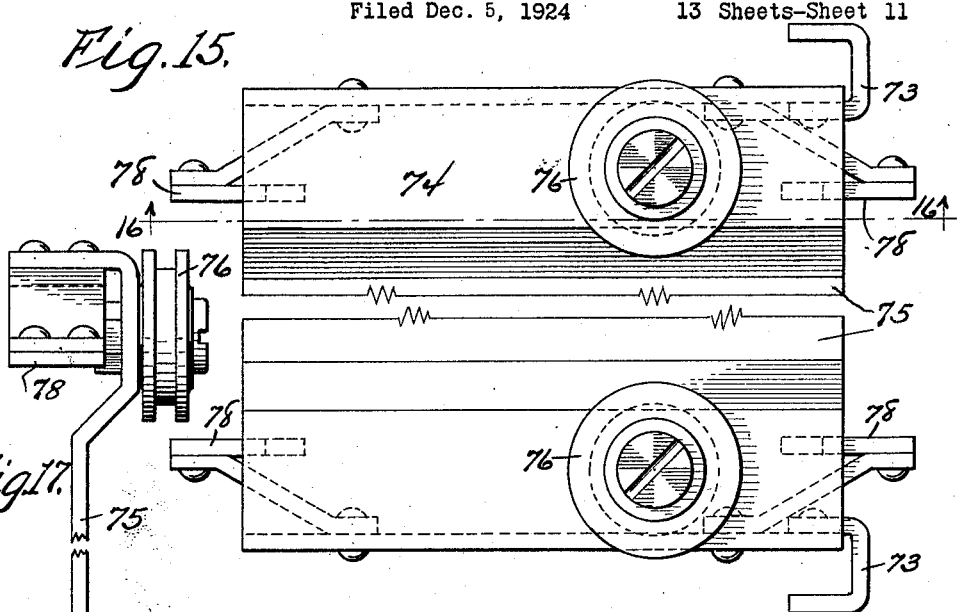
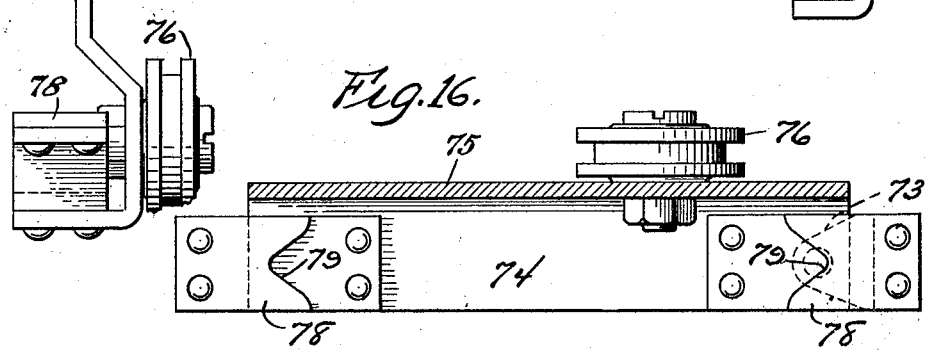
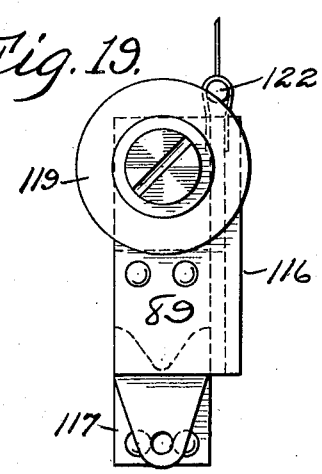
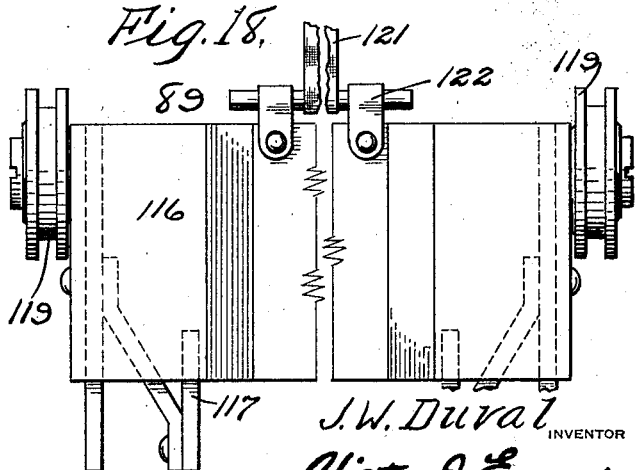
J. W. Duval INVENTOR
BY Victor J. Evans ATTORNEY
WITNESS Jan. 29, 1929.

J. W. DUVAL 1,700,435

AUTOMATIC ADVERTISING MACHINE

Filed Dec. 5, 1924     13 Sheets-Sheet 12

J. W. Duval
INVENTOR

BY Victor J. Evans
ATTORNEY

WITNESS

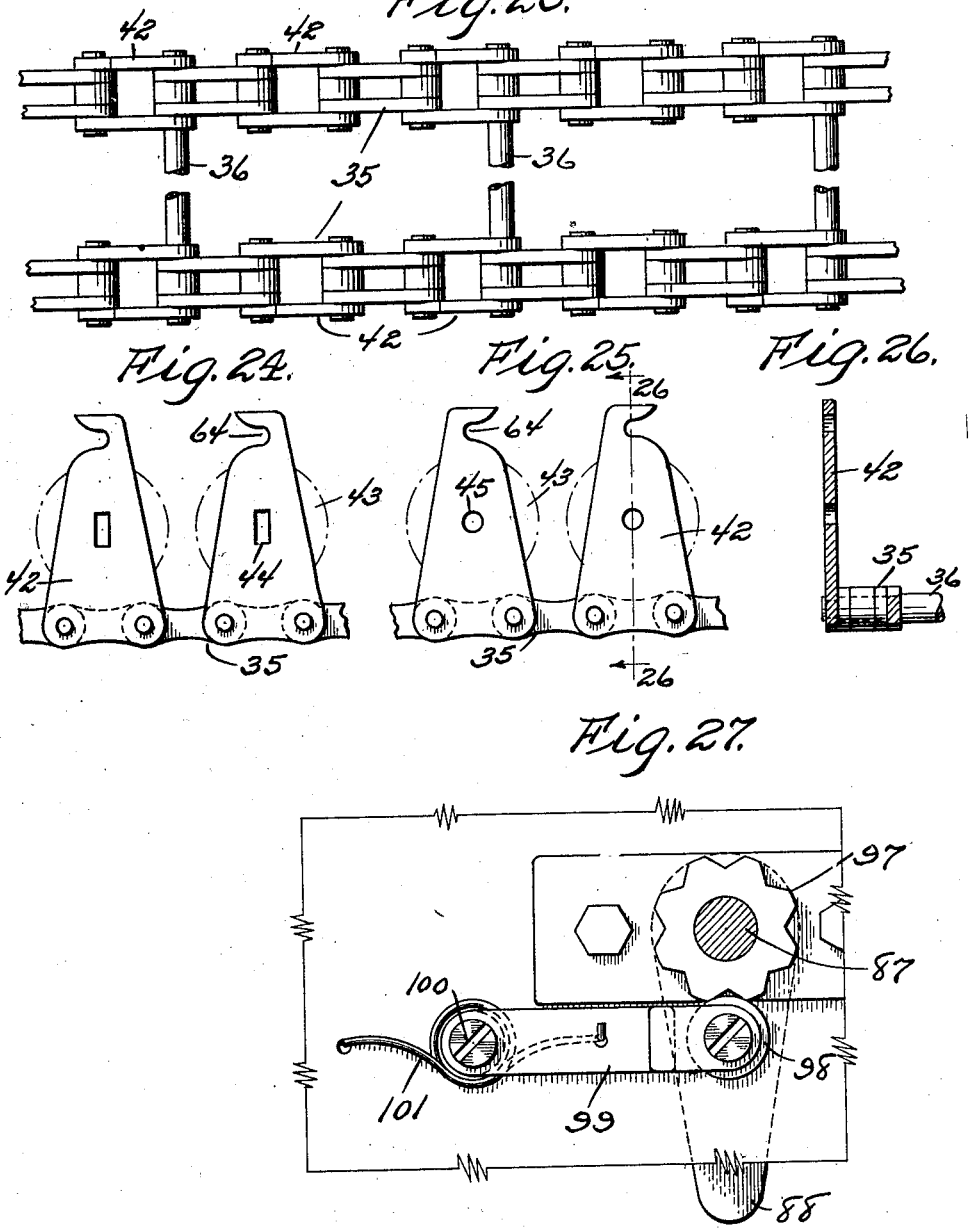

Patented Jan. 29, 1929.

1,700,435

UNITED STATES PATENT OFFICE.

JOHN W. DUVAL, OF PITTSBURGH, PENNSYLVANIA; ELSIE DUVAL EXECUTRIX OF SAID JOHN W. DUVAL, DECEASED.

AUTOMATIC ADVERTISING MACHINE.

Application filed December 5, 1924. Serial No. 754,072.

This invention relates to advertising machines and is an improvement upon a machine covered by Letters Patent Numbered 1,420,627, granted to me June 27, 1922.

Like the machine covered by the patent mentioned, the present machine aims to provide an automatic advertising machine wherein a number of advertisements will be singly and consecutively brought into view, the present invention providing simplified positively operated means for accomplishing the above purpose.

In addition, the present invention like the machine of the previous patent provides a directory or information device which is utilized in conjunction with the advertising device to attract attention to the machine, the mechanism of the directory or information device also being of a simplified and novel character.

A further object of the invention is the provision of improved means for selecting the particular information sheet or curtain so that the latter may be more readily brought into view.

With the above and other objects in view, the invention further includes the following novel features and details of construction, to be hereinafter more fully described, illustrated in the accompanying drawings and pointed out in the appended claims.

In the drawings:—

Figure 1 is a front elevation of the improved machine.

Figure 2 is a side view of the same.

Figure 11 is a fragmentary plan view partly in section showing a portion of the information mechanism.

Figure 12 is a section taken substantially on the line 12—12 of Figure 11.

Figure 15 is an enlarged elevation partly broken away showing the carriage for the advertising curtains.

Figure 16 is a section on the line 16—16 of Figure 15.

Figure 17 is an end view of Figure 15.

Figure 18 is a fragmentary elevation of the carriage for the information curtains.

Figure 19 is an end view of the same.

Figure 23 is an enlarged fragmentary elevation of the carrier chain for the advertising mechanism.

Figures 24 and 25 are enlarged fragmentary views of the carrier chains for both the advertising and information mechanisms.

Figure 26 is a section on the line 26—26 of Figure 25.

Figure 27 is an enlarged fragmentary sectional view on the line 27—27 of Figure 14.

Figure 3:
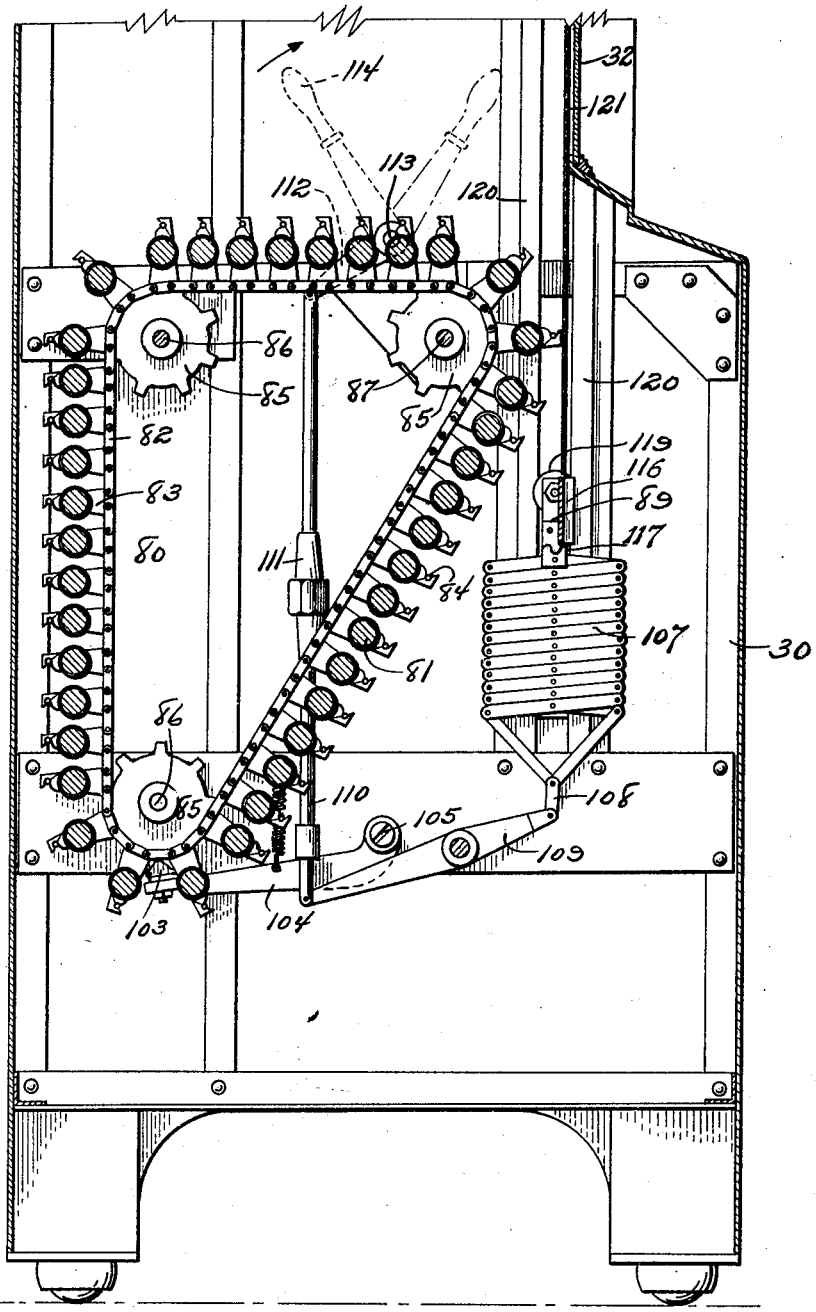
Figure 3 is an enlarged vertical sectional view through the lower portion of the machine and illustrating the information mechanism.

While the invention is herein described and shown as an advertising device, it will be apparent from an understanding of the same that it is susceptible of various other uses and it is not the purpose of the present application to limit the invention to this use. For a clear understanding of the invention, certain of the mechanism will be referred to as the advertising mechanism, while certain other mechanism will be referred to as the directory or information mechanism.

Referring in detail to the drawings wherein like characters of reference denote corresponding parts, the machine as shown comprises a casing or cabinet 30, the front of which is provided with an upper glass covered sight opening 31 and a lower glass covered sight opening 32, while below this last mentioned sight opening the cabinet is provided with doors 33 whereby access may be had to the interior. Any suitable means may be provided for obtaining access to the upper portions of the cabinet, such as a removable or hinged top, or the openings 31 and 32 may be closed by glass panelled doors.

Arranged within the cabinet behind the opening 31 is the advertising mechanism. This mechanism is automatically operated and comprises carriers 34. These carriers include upper and lower spaced sprocket chains 35, certain of the links of which are connected by spacing rods 36, the purpose of the rods being to hold the upper and lower chains 35 properly spaced apart for engagement with upper and lower sprocket wheels 37. The wheels 37 are mounted upon spaced vertically disposed shafts 38 and 39, the latter being hereinafter referred to as drive shafts. The shafts 38 and 39 are mounted in bearings carried by upper and lower spaced transverse bars 40, the lower bearings being preferably in the form of anti-friction thrust bearings 41.

The construction of the chains 35 is illustrated in detail in Figures 23 to 26 of the drawings and as shown, each alternate link of these chains includes a bearing plate 42, the plates 42 being adapted to provide bearings for the opposite ends of spring actuated curtains 43. The plates of one chain are provided with rectangular openings 44 for the reception of similarly shaped trunnions which extend from one end of the rollers of the curtains 43, while the opposite plates are provided with circular openings 45 for the reception of screws, whereby the curtains may be removably secured to the chains.

Rotation of the sprocket wheels 37 will thus move the curtains 43 toward and away from the opposite ends of the opening 31 and in order to accomplish this movement the shafts 39 are alternately and intermittently operated from an electric motor 46. The shaft 47 of this motor enters a housing 48 and is operatively connected to a shaft 49 through reducing gearing 50, the housing preferably containing a suitable lubricant within which the gears operate.

Figure 9:
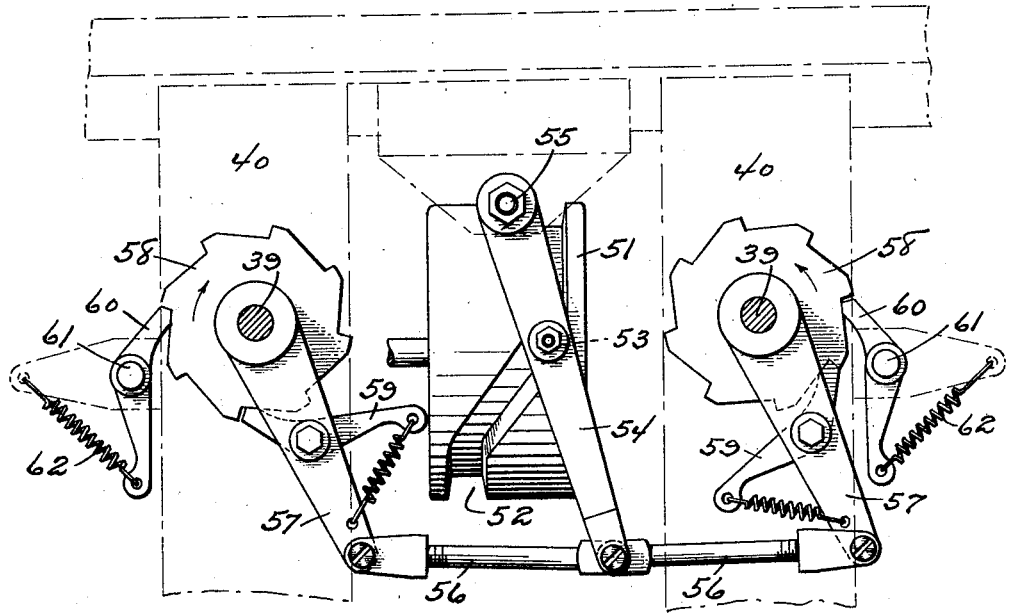
Figure 9 is an enlarged fragmentary horizontal section illustrating the mechanism for actuating the curtain carriers of the advertising mechanism.

The shaft 49 has connected thereto a cam 51, in the periphery of which there is provided a cam groove 52 and operating within this groove is a roller 53 which is carried by a horizontally disposed lever 54. One end of this lever is pivotally mounted as indicated at 55 in Figures 6 and 9 of the drawings, while the opposite end of the lever is pivotally connected to a rod 56.

The rod 56 has its opposite ends pivotally connected to the outer ends of arms 57, the inner ends of these arms being loose upon the drive shafts 39. Secured upon these shafts 39 are ratchet wheels 58 and the arms 57 have pivotally secured thereto oppositely disposed spring actuated pawls 59 which engage the teeth of the ratchet wheels 58. Thus, when the cam is operated, the lever 54 will be swung upon its pivot 55 in opposite directions and the pawls 59 will alternately impart a step by step movement to the shafts 39 so that the latter will be intermittently rotated in opposite directions. The shafts 39 are held against retrograde movement by means of holding pawls 60 which are pivotally mounted as shown at 61 and which yieldingly engage the ratchet wheels 58 under the influence of springs 62. The carriers 34 will thus be alternately and intermittently moved in the direction of the arrows shown in Figure 6 of the drawings.

Figure 8:
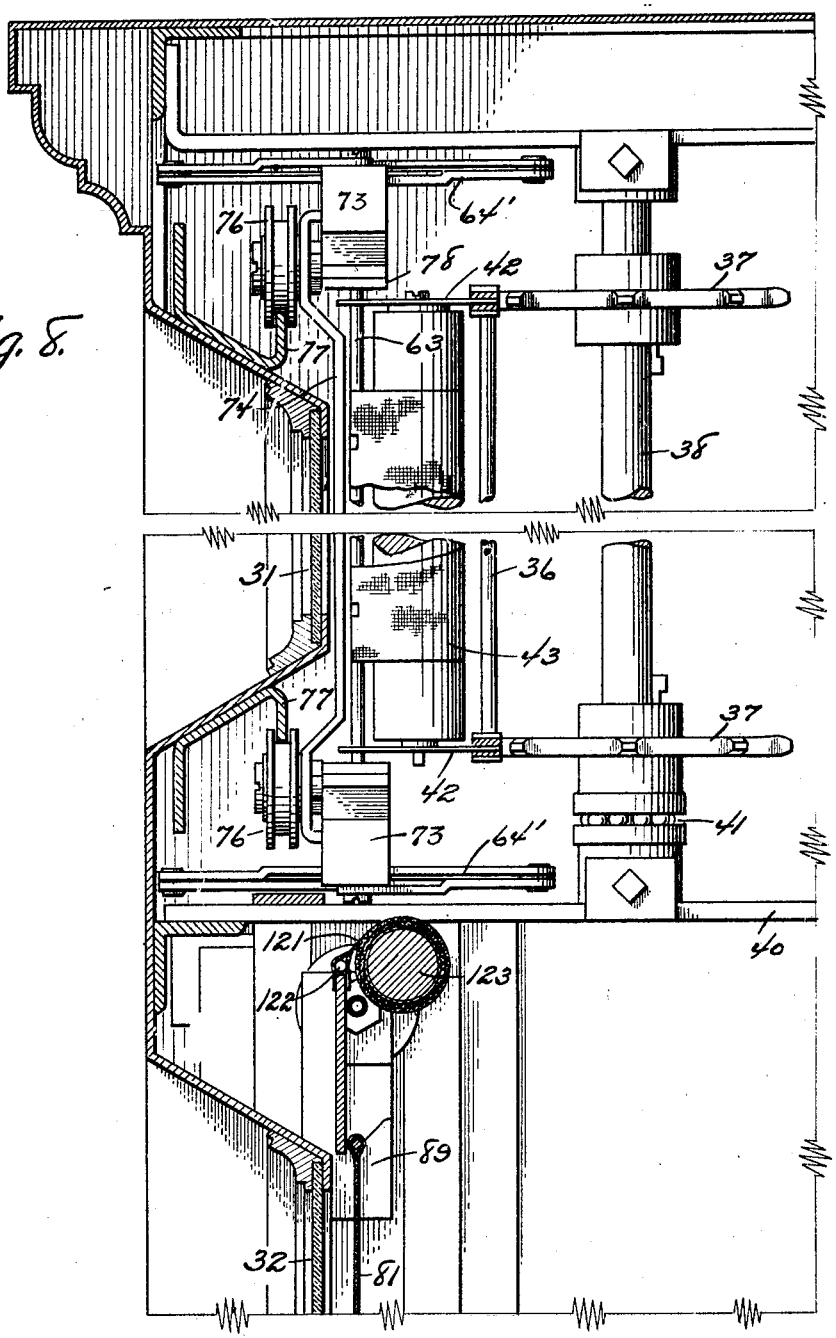
Figure 8 is an enlarged vertical sectional view through the upper portion of the machine showing the advertising mechanism with parts omitted.

The outer ends of the curtains 43 carry rods 63 whose opposite ends are adapted to rest within notches 64 provided in the outer ends of the plates 42, the rods being of sufficient length to extend an appreciable distance beyond these plates as shown in Figure 8 of the drawings.

Figure 6:
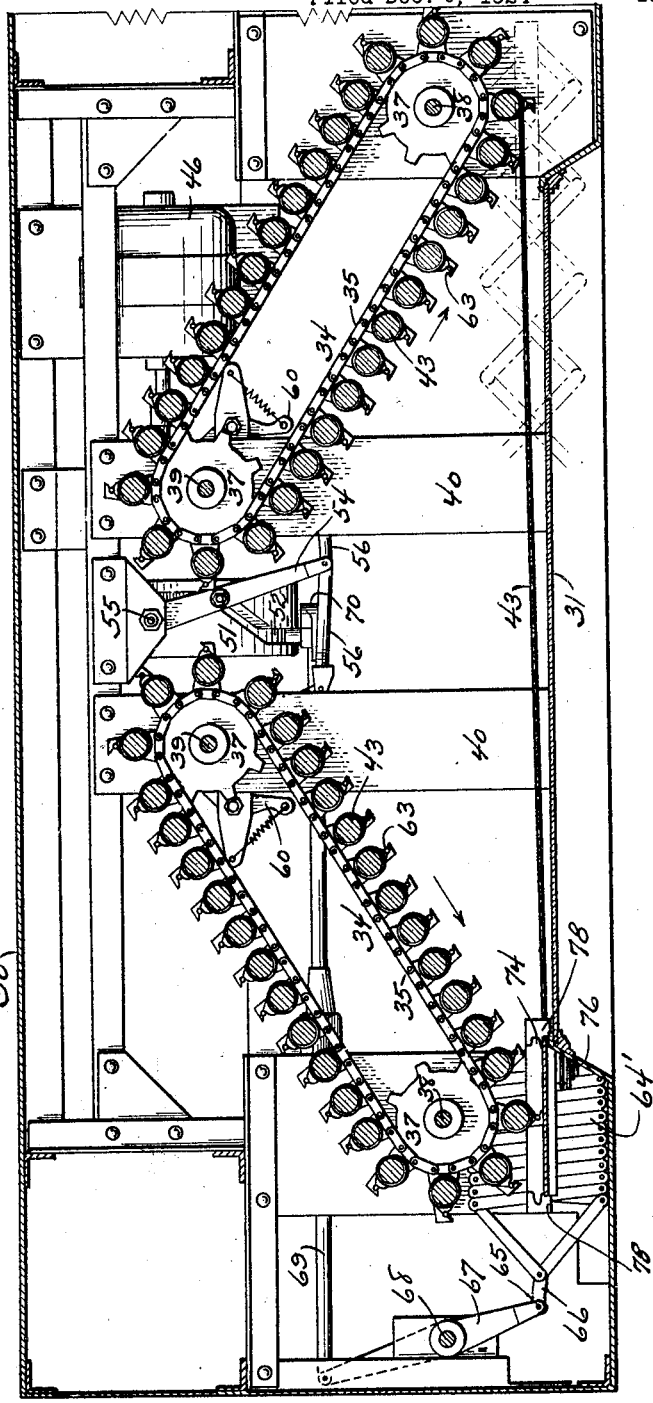
Figure 6 is a similar view taken on the line 6—6 of Figure 1.
Figure 7:
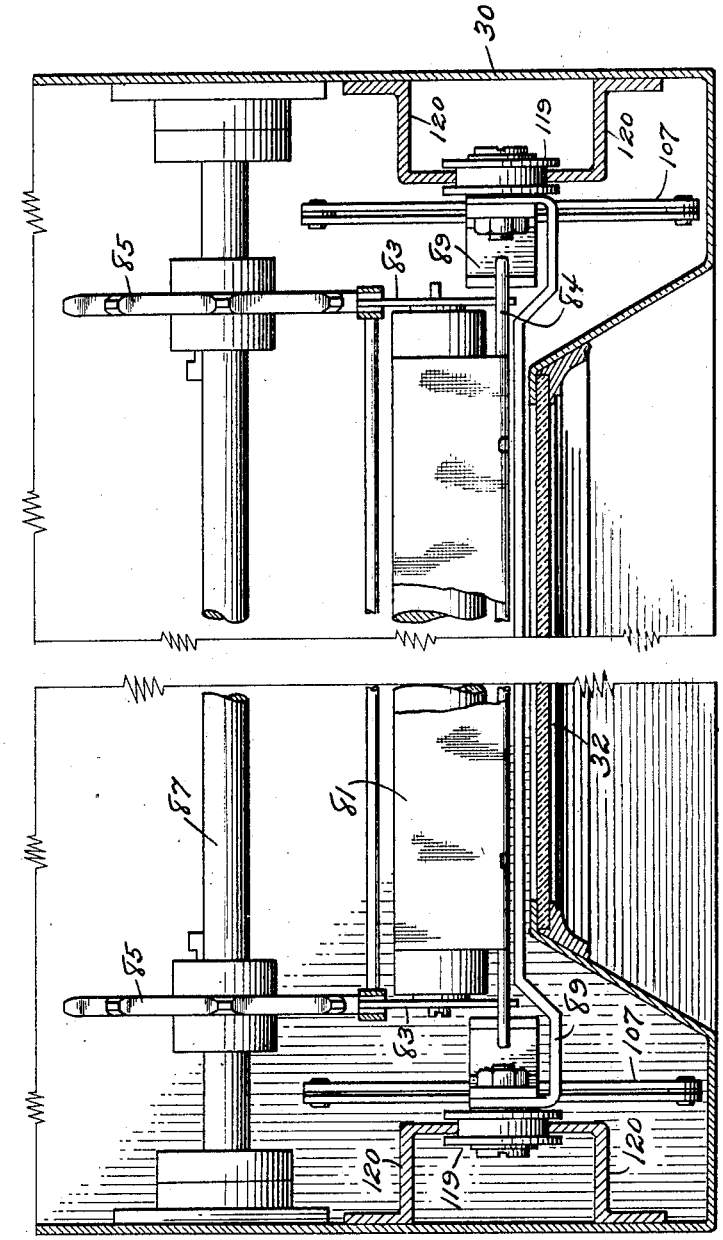
Figure 7 is an enlarged fragmentary horizontal section taken substantially on the line 5—5 of Figure 1, parts being omitted.
Figure 10:
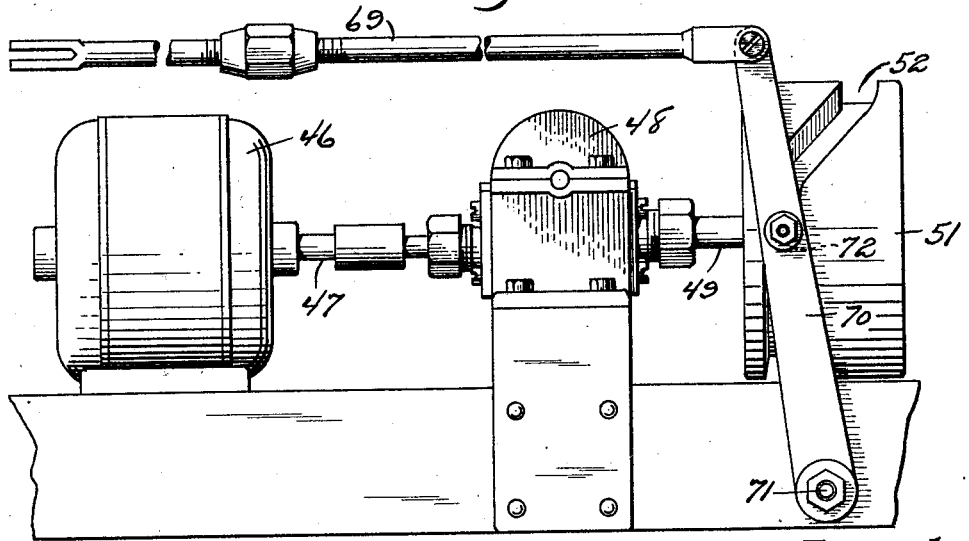
Figure 10 is an elevation showing a fragmentary portion of the actuating mechanism for bringing the curtains within the sight opening of the advertising mechanism.
Figure 13:
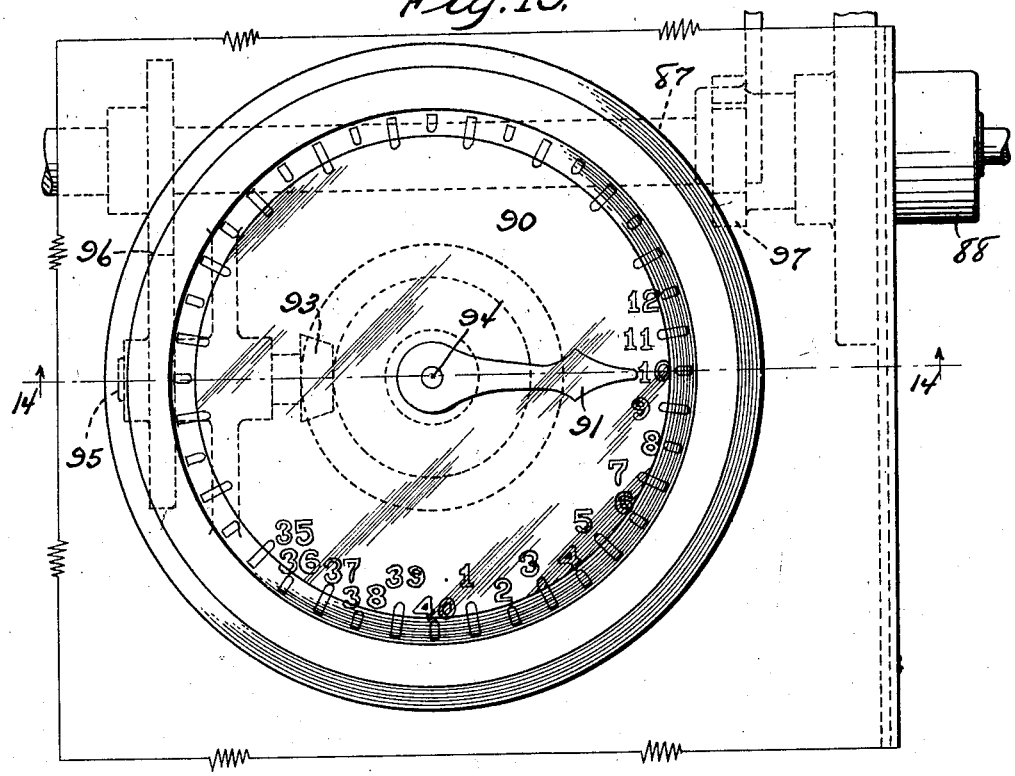
Figure 13 is a fragmentary plan view showing the setting dial.
Figure 14:
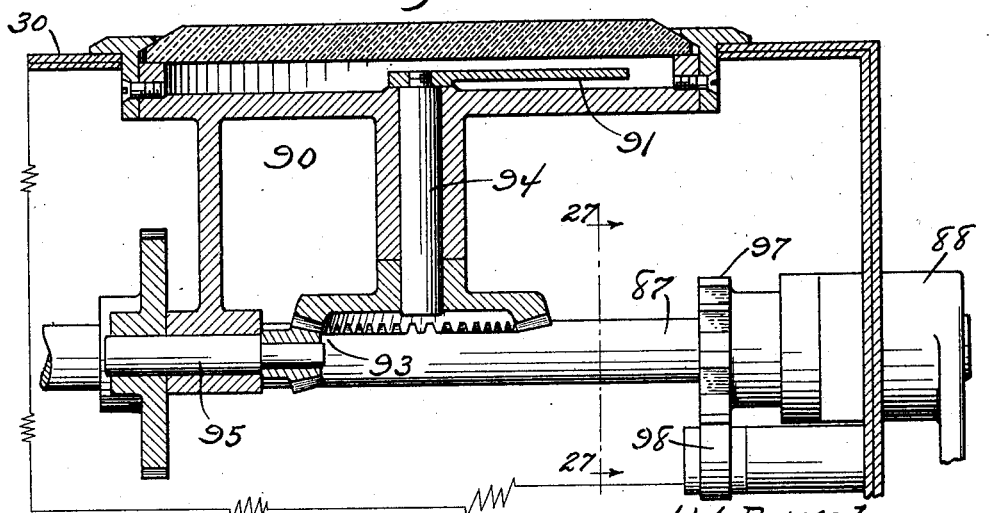
Figure 14 is a section taken substantially on the line 14—14 of Figure 13.
Figure 20:
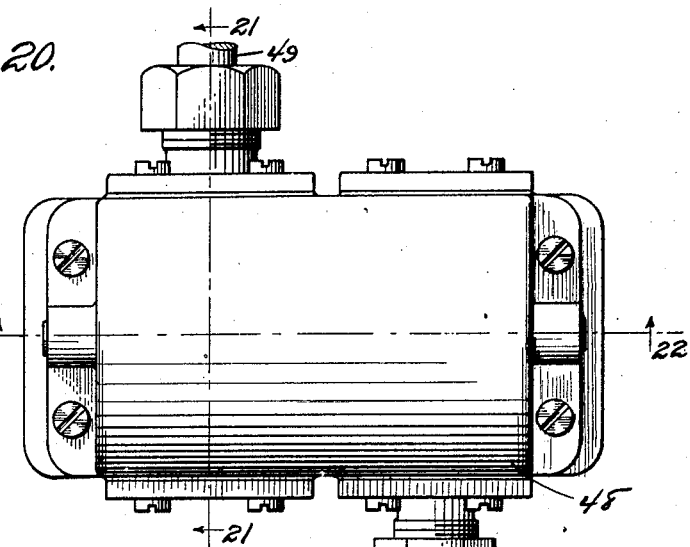
Figure 20 is a plan view of the housing for the reduction gearing of the advertising mechanism.
Figure 21:
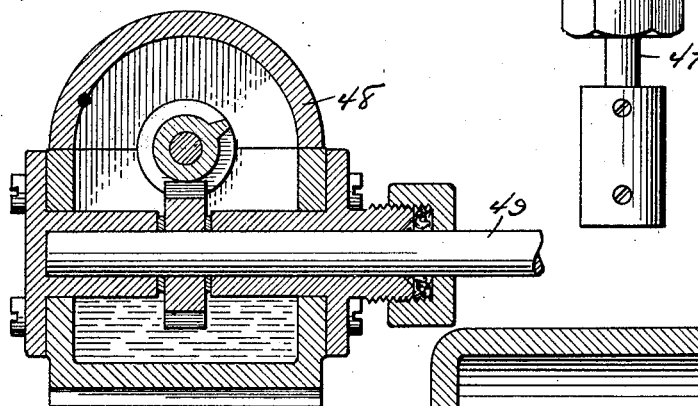
Figure 21 is a section on the line 21—21 of Figure 20.
Figure 22:
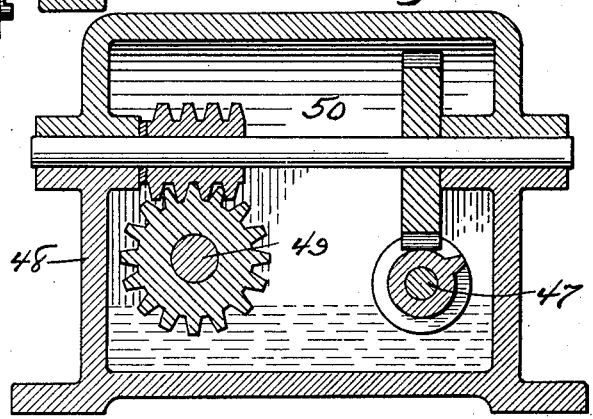
Figure 22 is a similar view on the line 22—22 of Figure 20.

The outer ends of the rods 63 are adapted to be engaged to arrange the curtains in unrolled position within the sight opening 31 as in the machine covered by the patent before mentioned, the means now provided for this purpose however differing from that previously used. In the present invention there is provided a lazy tong device 64' which has its inner end or inner links pivotally mounted at a stationary point, so that when the device is operated its outer end will be projected transversely across the cabinet, there being one of these devices 64' arranged above and one below the sight opening 31 as illustrated in Figure 8 of the drawings. The devices 64' are normally positioned at one end of the opening 31 and their inner ends are connected by links 65 with a relatively short link 66. This link is in turn pivotally connected to one end of a rocker arm 67 which is mounted for pivotal movement as shown at 68. The opposite end of the rocker arm 67 is connected to one end of a rod 69 and the latter is in turn connected to a lever 70, as shown in Figures 6 and 10 of the drawings. The lever 70 operates similar to the lever 54, but is vertically disposed, being pivotally mounted as shown at 71 and provided with a roller 72 which operates in the cam groove 52. The shape of this groove 52 is such that when the lever 54 is reciprocated the lever 70 will be stationary and vice versa, the purpose of which will be presently apparent.

Figure 4:
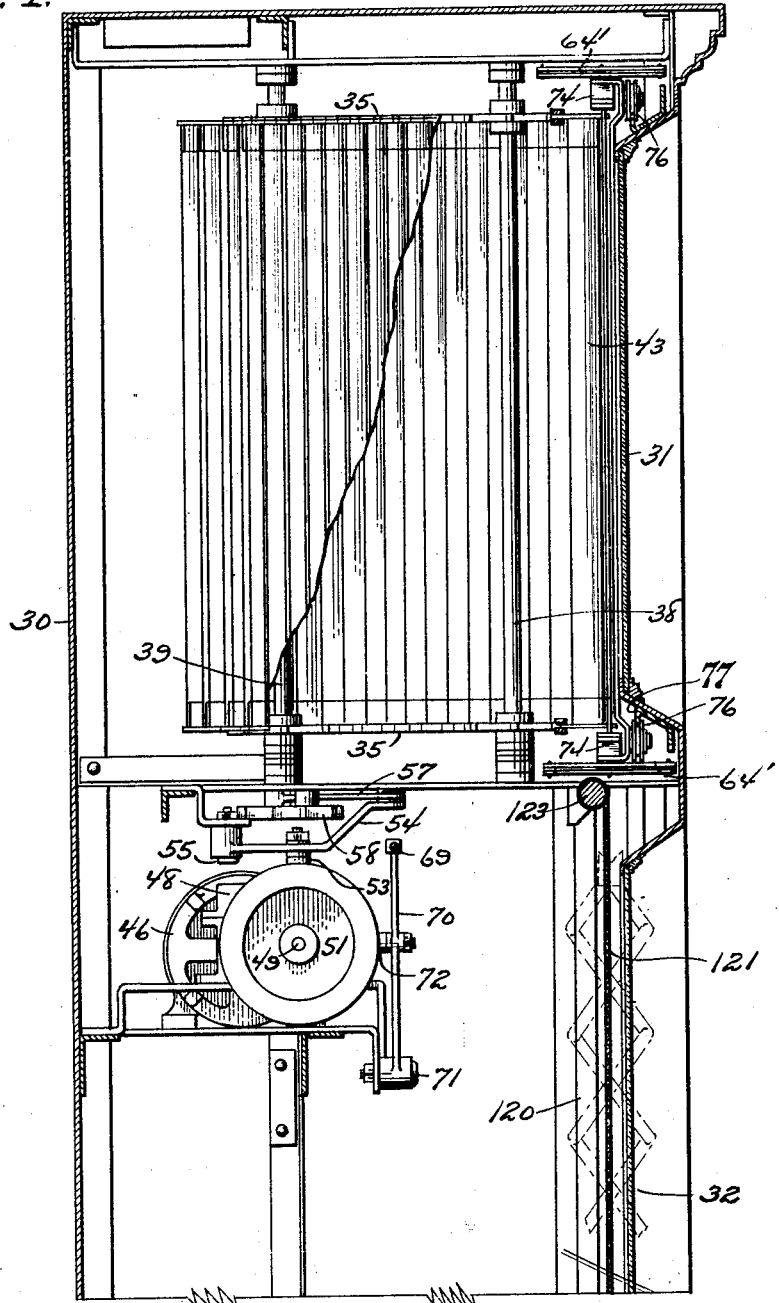
Figure 4 is a similar view through the upper portion of the machine illustrating the advertising mechanism.
Figure 5:
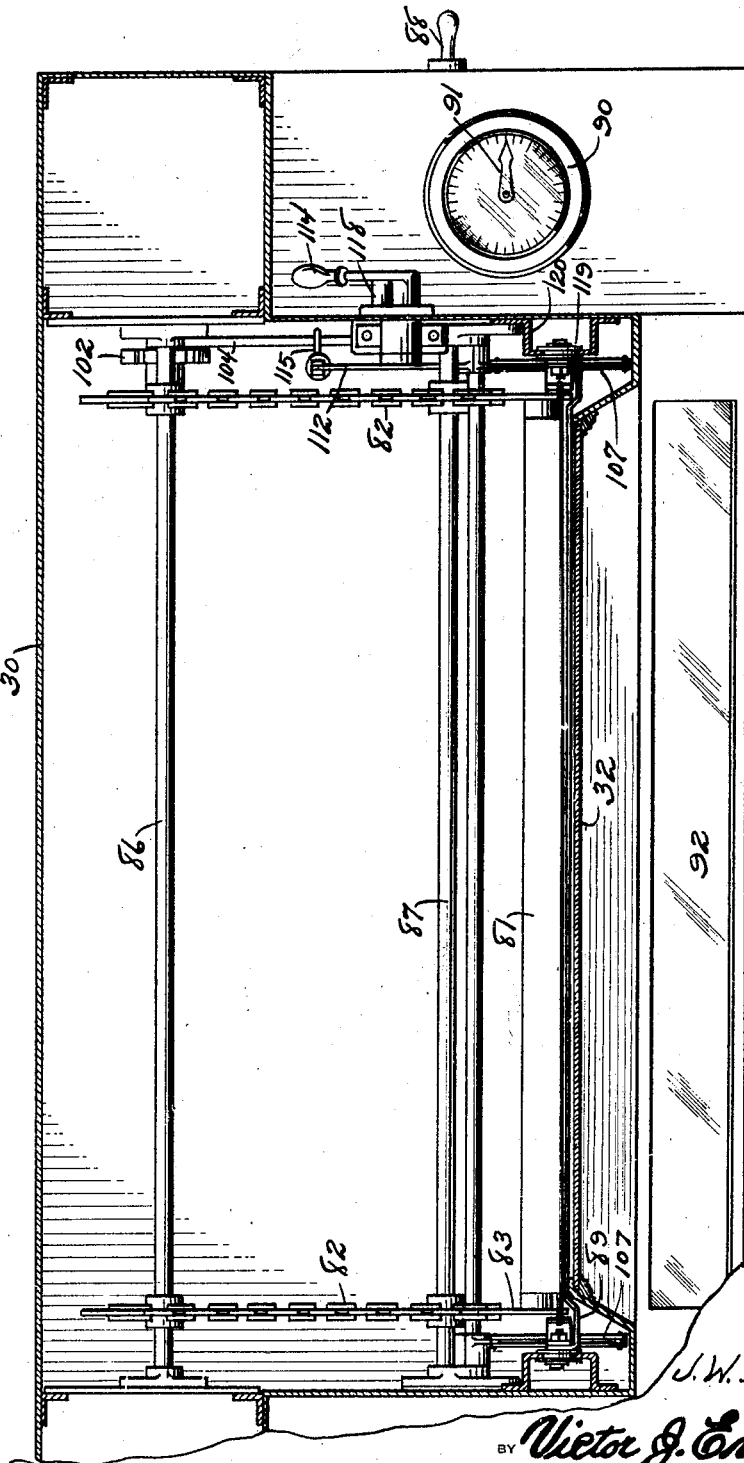
Figure 5 is an enlarged horizontal sectional view taken substantially on the line 5—5 of Figure 1.

Carried at the outer ends of the devices 64' and secured to these devices by means of substantially U-shaped brackets 73 is a carriage which is indicated generally at 74 in Figures 6 and 8 of the drawings and which is shown in detail in Figures 15 to 17. The inner limb of each bracket 73 is fastened to a side piece of the carriage and the outer limb of each bracket is fastened to the free end of the lazy tong device, as shown in Figure 4. This carriage includes a plate 75 upon which is mounted grooved rollers 76 and these rollers engage oppositely disposed tracks 77 which extend longitudinally above and below the sight opening 31. Secured to the plate 75 and extending inwardly from the upper and lower edges of the plate at each end thereof are spaced oppositely disposed plates 78 which are provided with opposed notches 79 defining hooks. These hooks are so spaced that when the lazy tong devices 64' are extended as illustrated by the dotted lines in Figure 6 of the drawings they will engage the extended ends of one of the rods 63 of a curtain which has been previously positioned through the operation of the cam operated ratchet mechanism previously described, the mechanism being so timed that the rod of one of the curtains will be arranged for engagement by one pair of hooks, the curtain carrier being at rest. The lever 70 will operate to extend the lazy tong devices 64' and carry the end of the engaged curtain across the opening, whereupon the lever 70 will rest and the lever 54 will operate to move the carrier 34 at this end of the opening 31 so as to arrange a rod of one of the curtains in the path of the other pair of hooks. When this carrier 34 rests, the lever 70 will again operate to move the lazy tong devices 64' in a reverse direction so that another curtain will be engaged and positioned within the sight opening 31, while the previously positioned curtain will be permitted to return to its original rolled position. This operation is repeated, the carriers being alternately operated for engagement by the hooks of the carriage 74, so that the curtains will be alternately unrolled and rerolled, a curtain from opposite ends of the sight opening being alternately brought into view.

Located within the cabinet beneath the sight opening 32 is a carrier 80, which is similar in construction to the carriers 34 described in connection with the advertising mechanism. This carrier 80 is designed to carry the information curtains 81, which are spring actuated and are similar to the curtains 43. The carrier 80 comprises spaced chains 82 which are arranged so that the curtains 81 will be moved vertically, instead of horizontally as in the carrier 34. The chains 82 carry bearing plates 83 which support the curtain rollers and which have notches in their outer ends for receiving rods 84 which are carried at the outer ends of the curtains.

The chains 82 travel over sprockets 85 which are mounted upon shafts 86 and 87, the last mentioned shaft extending upon the outside of the cabinet and being provided with a crank arm or crank handle 88, whereby the shaft 87 may be manually rotated and the carrier moved. One of the rods 84 of the curtains 81 may thus be positioned in the path of a curtain engaging carriage 89 to unroll said curtain within the sight opening 32.

For the purpose of selectively positioning any one of the curtains 81 for engagement by the carriage 89 there is provided a selector dial 90 which is mounted upon the outside of the cabinet. Operating from this dial is a pointer 91 which is adapted to be positioned opposite any one of a number of divisions or graduations arranged upon the dial, the number corresponding to the number of curtains 81. Of course this number may be varied as desired, there being forty curtains shown and forty graduations upon the dial 90, the said graduations being numbered from one to forty inclusive and the numbers corresponding to the curtains 81. Mounted upon the cabinet is an index chart 92 upon which is arranged suitable indicia. For example, the curtains 81 of the information mechanism are adapted to contain information relative to various streets, buildings or points of interest. This information may be arranged upon the curtains in alphabetical order and the curtains numbered in accordance with the numbers upon the dial 90, so that by reference to the index 92 it will be seen that if the information desired will begin with the letter P, this letter of the alphabet will be found upon the mark 28. In other words if the machine is located in the city of Washington and a person desires to ascertain the location of the Patent Office he would consult the index chart 92 and find that the letter P would appear upon mark 28. He would then operate the crank handle 88 to bring the pointer 91 opposite the numeral 28, whereupon the proper curtain would be arranged to be engaged by the carriage 89. Movement of the indicator 91 is obtained through the medium of beveled gears 93 which connect with the indicator arbor 94, one of these gears 93 being mounted upon a stub shaft 95 which is geared to the shaft 87, as indicated at 96, so that rotation of the shaft 87 in addition to operating the carrier 80 will also operate the indicator arm 91.

The shaft 87 has mounted thereon a toothed wheel 97 which is yieldingly engaged by a roller 98 which is mounted upon one end of an arm 99. This arm is pivotally mounted as indicated at 100 and the tooth 98 is pressed into engagement with the toothed wheel 97 by means of a spring 101. This will insure proper positioning of the rod 84 of the selected curtain.

Mounted upon the lower shaft 86 is a star wheel 102 which is adapted to be engaged by a tooth 103 which is carried at the outer end of an arm 104. This arm is pivotally mounted as indicated at 105 and the tooth 103 is yieldingly forced into engagement with the star wheel 102 by means of a spring 106. This will serve to hold the carrier 80 against accidental movement.

The carriage 89 like the carriage 74 has connected thereto spaced lazy tong devices 107 and the latter have a link connection 108 with rocker arms 109. One of these devices is connected to a rod 110 whose length is adjustable through a connection 111. The upper end of this rod is connected to an arm 112 which is fast upon a short shaft 113. This shaft extends through the casing of the cabinet and has secured thereon an operating arm 114.

By reference to Figure 3 of the drawings it will be seen that when the arm 114 is moved in the direction of the arrow, the lazy tong devices 107 will be extended so that the carriage 89 will be moved vertically. During this movement the carrier 80 will be held against operation by engagement of the tooth 103 with the wheel 102 and in order to release the carrier after the carriage has been returned to normal position, the rod 110 carries a finger 115 which presses down upon the arm 104 to disengage the tooth from the wheel. This may be clearly seen by reference to Figures 3, 11 and 12 of the drawings.

The carriage 89 is illustrated in Figures 18 and 19 and comprises a plate 116 which carries spaced rod engaging plates or hooks 117 which are similar to the hooks 78. These hooks are adapted to engage the rod 84 of the particular curtain desired and when the lazy tong devices 107 are extended, the curtain will be carried upward within the display opening 32. The curtain may be held in displayed position through the engagement of a spring dog or detent with an opening 118, the said dog or detent being carried by the arm 114.

The plate 116 of the carriage 89 carries grooved rollers 119 which engage spaced tracks 120 which extend vertically upon opposite sides of the sight opening 32.

The opening 32 is normally covered by a curtain 121, one end of which is secured to the carriage 89 as indicated at 122. This curtain is mounted upon a spring roller 123 and as the carriage 89 ascends the said curtain 121 will be wound upon this roller, the selected curtain 81 which is engaged by the carriage 89 taking its place.

The invention is susceptible of various changes in its form, proportions and minor details of construction and the right is herein reserved to make such changes as properly fall within the scope of the appended claims.

Having described the invention what is claimed is:—

1. An apparatus of the class described comprising a casing having a display opening therein, a flexible endless conveyor having one end arranged adjacent one end of the display opening, a motor for the conveyor, a plurality of springs controlled normally rolled curtains carried equidistantly along the conveyor, means for feeding the carrier and curtains one at a time to a position at the end of the opening, a power operated lazy tong device movable in a plane parallel to the opening for unrolling a curtain across said opening when displayed and means for actuating said device 2. An apparatus of the class described comprising a casing having a display opening therein, a track extending parallel with the opening, a carriage on the track, a lazy tong device for reciprocating the carriage on the track and endless carrier for a series of spring controlled normally roller curtains, means for feeding the carrier and said curtains one at a time to a position at one end of the opening and means on the carriage for engaging a part of a curtain so positioned so that the curtain will be unrolled and extended across the opening on the forward movement of the carriage and permitted to return to rolled condition on the rearward movement of the carriage.

3. An apparatus of the class described comprising a casing having a display opening therein, a track extending parallel with the opening, a carriage on the track, a lazy tong device for reciprocating the carriage on the track, an endless carrier normally having nested therein a plurality of spring controlled normally rolled curtains, means for feeding said curtains one at a time to a position at one end of the opening, means on the carriage for engaging a part of a curtain so positioned so that the curtain will be unrolled and extended across the opening on the forward movement of the carriage and permitted to return to rolled condition on the rearward movement of the carriage and means common to the feeding means and the lazy tong devices for automatically operating the same.

4. A machine embodying a cabinet having a display opening therein, an endless sprocket fed carrier, a plurality of normally rolled curtains nested therein, spaced lazy tong devices mounted at one end of the opening, means for moving the curtains into position at each end of the display opening, means for operating the lazy tong devices, means common to both the curtain moving means and the operating means for the lazy tong devices for controlling their operation and spaced pairs of oppositely disposed hooks connected with the lazy tong devices whereby the latter will alternately engage and release a curtain at the limit of movement of the lazy tong devices in each direction.

5. A machine embodying, a cabinet having a display opening therein, an endless flexible carrier, a plurality of normally rolled curtains normally nested therein, spaced lazy tong devices mounted at one end of the opening, means for moving the curtains into position at each end of the display openings, means for operating the lazy tong devices, means common to both the curtain moving means and the lazy tong devices, operating means for the lazy tong devices for controlling their operation, a carriage connected to the lazy tong devices, spaced tracks extending along oppostie edges of the opening, means operatively connecting the carriage and tracks to guide the former and means included in the carriage whereby the latter will alternately engage and release a curtain at the limit of movement of the lazy tong devices in each direction.

6. A machine embodying a cabinet having a display opening therein, an endless carrier at each end of the opening, a plurality of normally rolled curtains mounted upon each carrier, means engageable with the curtains to alternately position a curtain from each carrier within the opening in unrolled condition, means including spaced drive shafts for rotatably supporting the carriers, a ratchet mechanism for each drive shaft, a rod connecting the ratchet mechanisms, whereby movement of the rod will alternately rotate the drive shafts in opposite directions and means connected to the rod for moving the latter.

7. A machine embodying a cabinet having a display opening therein, an endless carrier at each end of the opening, a plurality of normally rolled curtains mounted upon each carrier, means engageable with the curtains to alternately position a curtain from each carrier within the opening in unrolled condition, means including spaced drive shafts for rotatably supporting the carriers, a ratchet mechanism for each drive shaft, a rod connecting the ratchet mechanisms, whereby movement of the rod will alternately rotate the drive shafts in opposite directions and a cam operated pivotally mounted lever connected to the rod for moving the latter.

8. A machine embodying a cabinet having a display opening therein, a flexible sprocket fed carrier mounted for movement at one end of the opening, a plurality of normally rolled curtains normally nested in the carrier, a curtain engaging carriage mounted for movement across the opening, means included in the carriage for detachable engagement with a curtain whereby the latter may be presented unrolled within the opening, means whereby the carriage may be moved and means whereby the carrier may be moved to position a particular curtain in the path of the curtain engaging carriage and automatically operated means for yieldingly holding the carrier against movement.

9. A machine embodying a cabinet having a display opening therein, a sprocket fed flexible carrier mounted for movement at one end of the opening, a plurality of normally rolled curtains nested in series upon the carrier, a curtain engaging carriage mounted for movement across the opening, means included in the carriage for detachable engagement with a curtain whereby the latter may be presented unrolled within the opening, means whereby the carriage may be moved, means whereby the carrier may be moved to position a particular curtain in the path of the curtain engaging carriage and automatically operated means for yieldingly holding the carrier against movement and means whereby operation of the carriage operating means will release the carrier holding means.

10. A machine embodying a cabinet having a display opening therein, a carrier mounted for movement at one end of the opening, a plurality of normally rolled curtains mounted upon the carrier, a curtain engaging carriage mounted for movement across the opening, means included in the carriage for detachable engagement with a curtain whereby the latter may be presented unrolled within the opening, means whereby the carriage may be moved, said means comprising spaced extensible arms secured to the carriage, rocker arms connected to the spaced extensible arms, an operating lever, means connecting the operating lever with one of the rocker arms and means whereby the carrier may be moved to position a particular curtain in the path of the curtain engaging means.

In testimony whereof I affix my signature.

JOHN W. DUVAL.